(12) United States Patent
Kim

(10) Patent No.: US 9,837,044 B2
(45) Date of Patent: Dec. 5, 2017

(54) ELECTRONIC DEVICE AND METHOD OF UPDATING SCREEN OF DISPLAY PANEL THEREOF

(71) Applicant: Samsung Electronics Co., Ltd., Suwon-si, Gyeonggi-do (KR)

(72) Inventor: Jungbae Kim, Gwangju (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/014,466

(22) Filed: Feb. 3, 2016

(65) Prior Publication Data

US 2016/0275908 A1 Sep. 22, 2016

(30) Foreign Application Priority Data

Mar. 18, 2015 (KR) ........................ 10-2015-0037293

(51) Int. Cl.
*G09G 5/10* (2006.01)
*G09G 5/00* (2006.01)
*G09G 5/12* (2006.01)
*G06F 1/06* (2006.01)
*G06F 3/14* (2006.01)
*G09G 5/36* (2006.01)

(52) U.S. Cl.
CPC ............... *G09G 5/006* (2013.01); *G06F 1/06* (2013.01); *G06F 3/1423* (2013.01); *G09G 5/12* (2013.01); *G09G 5/363* (2013.01); *G09G 2310/04* (2013.01); *G09G 2310/08* (2013.01); *G09G 2330/021* (2013.01); *G09G 2340/14* (2013.01); *G09G 2360/04* (2013.01)

(58) Field of Classification Search
CPC ........ G06F 1/1647; G06F 1/06; G06F 1/1692; G09G 2360/04; G09G 5/12
See application file for complete search history.

(56) References Cited

U.S. PATENT DOCUMENTS

| | | | |
|---|---|---|---|
| 7,962,171 | B2 | 6/2011 | Fu et al. |
| 7,995,096 | B1 | 8/2011 | Cressy et al. |
| 8,015,400 | B2 | 9/2011 | Little et al. |
| 8,016,419 | B2 | 9/2011 | Zhang et al. |
| 8,025,406 | B2 | 9/2011 | Zhang et al. |
| 8,027,633 | B2 | 9/2011 | Bushner |
| 8,050,203 | B2 | 11/2011 | Jacobsen et al. |
| 8,054,301 | B2 | 11/2011 | Pearce et al. |
| 8,059,117 | B2 | 11/2011 | Takatori |
| 8,123,361 | B2 | 2/2012 | Nagashima et al. |
| 8,126,391 | B2 | 2/2012 | Bushner |

(Continued)

*Primary Examiner* — Hau Nguyen
(74) *Attorney, Agent, or Firm* — Jefferson IP Law, LLP

(57) ABSTRACT

An electronic device is provided. The electronic device includes a first display panel including a first clock generator and that generates a first signal according to the first clock generator in response to a screen update request signal, a second display panel including a second clock generator and that generates a second signal according to the second clock generator in response to a screen update request signal, and a controller that transmits the screen update request signal to the first display panel and the second display panel and that receives the first signal and the second signal and that compares the first signal and the second signal to adjust a clock of at least one of the first clock generator and the second clock generator.

18 Claims, 12 Drawing Sheets

(56) References Cited

U.S. PATENT DOCUMENTS

| | | |
|---|---|---|
| 8,159,568 B2 | 4/2012 | Ahdoot |
| 8,164,742 B1 | 4/2012 | Carrieri et al. |
| 8,192,384 B2 | 6/2012 | Myrick et al. |
| 8,199,781 B2 | 6/2012 | Seo et al. |
| 8,213,519 B2 | 7/2012 | Raines et al. |
| 8,237,779 B2 | 8/2012 | Marshall et al. |
| 8,237,871 B2 | 8/2012 | Lad et al. |
| 8,248,614 B2 | 8/2012 | Mann et al. |
| 8,255,545 B1 | 8/2012 | Schmidt et al. |
| 8,265,166 B2 | 9/2012 | Raines et al. |
| 8,279,140 B2 | 10/2012 | Lee et al. |
| 8,279,269 B2 | 10/2012 | Peng |
| 8,294,656 B2 | 10/2012 | Park et al. |
| 8,305,492 B2 | 11/2012 | Gu |
| 8,312,476 B2 | 11/2012 | Chin et al. |
| 8,320,822 B2 | 11/2012 | Bushner |
| 8,325,119 B2 | 12/2012 | Yi |
| 8,331,407 B2 | 12/2012 | Choi |
| 8,362,973 B2 | 1/2013 | Cernasov et al. |
| 8,368,777 B2 | 2/2013 | Yanada et al. |
| 8,370,860 B2 | 2/2013 | Teng et al. |
| 8,384,766 B2 | 2/2013 | Routhier et al. |
| 8,401,149 B2 | 3/2013 | Park et al. |
| 8,406,741 B2 | 3/2013 | Kang et al. |
| 8,411,137 B2 | 4/2013 | Jacobs et al. |
| 8,433,532 B2 | 4/2013 | Lebrun |
| 8,433,543 B2 | 4/2013 | Lebrun |
| 8,440,951 B2 | 5/2013 | Furuya et al. |
| 8,457,187 B1 | 6/2013 | Aboujaoude et al. |
| 8,458,370 B1 | 6/2013 | Tsu et al. |
| 8,473,003 B2 | 6/2013 | Jung et al. |
| 8,473,277 B2 | 6/2013 | Jephcott |
| 8,480,234 B2 | 7/2013 | Richards |
| 8,482,601 B2 | 7/2013 | Thomas |
| 8,532,727 B2 | 9/2013 | Ali et al. |
| 8,558,815 B2 | 10/2013 | Van Genechten et al. |
| 8,565,388 B2 | 10/2013 | Mittal |
| 8,566,848 B2 | 10/2013 | Teng et al. |
| 8,643,325 B2 | 2/2014 | Yang |
| 8,643,638 B2 | 2/2014 | Bae et al. |
| 8,654,922 B2 | 2/2014 | Bendahan |
| 8,656,398 B2 | 2/2014 | Alexander |
| 8,723,705 B2 | 5/2014 | Musfeldt |
| 8,730,272 B2 | 5/2014 | Kim et al. |
| 8,738,904 B2 | 5/2014 | Ting |
| 8,756,615 B2 | 6/2014 | Chin et al. |
| RE45,087 E | 8/2014 | Little et al. |
| 8,827,899 B2 | 9/2014 | Farr et al. |
| 2001/0054131 A1 | 12/2001 | Alvarez, II et al. |
| 2002/0022503 A1 | 2/2002 | Lee |
| 2002/0085013 A1 | 7/2002 | Lippincott |
| 2002/0145610 A1 | 10/2002 | Barilovits et al. |
| 2003/0023710 A1 | 1/2003 | Corlett et al. |
| 2003/0151580 A1 | 8/2003 | Ma |
| 2003/0200548 A1 | 10/2003 | Baran et al. |
| 2003/0222880 A1 | 12/2003 | Waterman |
| 2003/0226069 A1 | 12/2003 | Legatt |
| 2004/0041813 A1 | 3/2004 | Kim |
| 2004/0164988 A1 | 8/2004 | Matsumoto |
| 2004/0239753 A1 | 12/2004 | Proctor et al. |
| 2005/0034159 A1 | 2/2005 | Ophir et al. |
| 2005/0062726 A1 | 3/2005 | Marsden et al. |
| 2005/0094103 A1 | 5/2005 | Robinson et al. |
| 2005/0104822 A1 | 5/2005 | Seki |
| 2005/0117654 A1 | 6/2005 | Im |
| 2005/0140634 A1 | 6/2005 | Takatori |
| 2005/0146607 A1 | 7/2005 | Linn et al. |
| 2006/0050146 A1 | 3/2006 | Richardson |
| 2006/0055626 A1 | 3/2006 | Tremblay |
| 2006/0064561 A1 | 3/2006 | Simeral et al. |
| 2006/0072005 A1 | 4/2006 | Thomas-Wayne |
| 2006/0101116 A1 | 5/2006 | Rittman et al. |
| 2006/0119604 A1 | 6/2006 | Yao et al. |
| 2006/0145981 A1 | 7/2006 | Lee et al. |
| 2006/0171453 A1 | 8/2006 | Rohlfing et al. |
| 2006/0197730 A1* | 9/2006 | Ooga .................. G09G 3/3611 345/98 |
| 2006/0218618 A1 | 9/2006 | Lorkovic |
| 2006/0227243 A1 | 10/2006 | Chu et al. |
| 2006/0245405 A1 | 11/2006 | Liu et al. |
| 2006/0256099 A1 | 11/2006 | Tashiro |
| 2007/0042823 A1 | 2/2007 | Shim |
| 2007/0055596 A1 | 3/2007 | Yankovich et al. |
| 2007/0075926 A1 | 4/2007 | Jung et al. |
| 2007/0130245 A1 | 6/2007 | So et al. |
| 2007/0166675 A1 | 7/2007 | Atkins et al. |
| 2007/0168457 A1 | 7/2007 | Huerta et al. |
| 2007/0172953 A1 | 7/2007 | Shim |
| 2007/0188406 A1 | 8/2007 | Ma |
| 2007/0195408 A1 | 8/2007 | Divelbiss et al. |
| 2007/0216651 A1 | 9/2007 | Patel |
| 2007/0222774 A1 | 9/2007 | Foster |
| 2008/0008044 A1 | 1/2008 | Patterson et al. |
| 2008/0036854 A1 | 2/2008 | Elliott et al. |
| 2008/0052083 A1 | 2/2008 | Shalev et al. |
| 2008/0069673 A1 | 3/2008 | Tsujihama |
| 2008/0076580 A1 | 3/2008 | Murdock et al. |
| 2008/0148040 A1 | 6/2008 | Machani et al. |
| 2008/0225472 A1 | 9/2008 | Chih |
| 2009/0041091 A1* | 2/2009 | Tseng ................ H04N 21/4305 375/145 |
| 2009/0059496 A1 | 3/2009 | Lee |
| 2009/0076368 A1 | 3/2009 | Balas |
| 2009/0084913 A1 | 4/2009 | Grabania et al. |
| 2009/0154782 A1 | 6/2009 | Zhang et al. |
| 2009/0195385 A1 | 8/2009 | Huang et al. |
| 2009/0231290 A1 | 9/2009 | Chen |
| 2009/0278779 A1 | 11/2009 | Liu et al. |
| 2009/0284666 A1 | 11/2009 | Svardal |
| 2009/0327425 A1 | 12/2009 | Gudipaty |
| 2010/0013910 A1 | 1/2010 | Farr |
| 2010/0030061 A1 | 2/2010 | Canfield et al. |
| 2010/0106859 A1 | 4/2010 | Won et al. |
| 2010/0198009 A1 | 8/2010 | Farr et al. |
| 2010/0208054 A1 | 8/2010 | Farr |
| 2010/0214227 A1 | 8/2010 | Hsieh et al. |
| 2010/0214280 A1 | 8/2010 | Kim |
| 2010/0218214 A1 | 8/2010 | Fan et al. |
| 2010/0225752 A1 | 9/2010 | Bench et al. |
| 2010/0245770 A1 | 9/2010 | Zhang et al. |
| 2010/0272102 A1 | 10/2010 | Kobayashi |
| 2010/0315427 A1 | 12/2010 | Wyatt et al. |
| 2010/0315595 A1 | 12/2010 | Marcus et al. |
| 2011/0001768 A1* | 1/2011 | Lin ..................... G09G 3/3685 345/698 |
| 2011/0032482 A1 | 2/2011 | Agurok |
| 2011/0115882 A1 | 5/2011 | Shahinian et al. |
| 2011/0202456 A1 | 8/2011 | Rodkey et al. |
| 2011/0231308 A1 | 9/2011 | Rodkey et al. |
| 2011/0298778 A1 | 12/2011 | Chiang |
| 2011/0304585 A1 | 12/2011 | Chang et al. |
| 2011/0320405 A1 | 12/2011 | Hsu et al. |
| 2012/0005316 A1 | 1/2012 | Perry et al. |
| 2012/0019719 A1 | 1/2012 | Takesue et al. |
| 2012/0032930 A1 | 2/2012 | Li et al. |
| 2012/0036525 A1 | 2/2012 | Mugulavalli et al. |
| 2012/0038827 A1 | 2/2012 | Davis |
| 2012/0075334 A1* | 3/2012 | Pourbigharaz ........ G06F 3/1438 345/619 |
| 2012/0084330 A1 | 4/2012 | Huynh |
| 2012/0092360 A1 | 4/2012 | Kang et al. |
| 2012/0098824 A1 | 4/2012 | Koo et al. |
| 2012/0142333 A1 | 6/2012 | Kasturi et al. |
| 2012/0268451 A1 | 10/2012 | Tsai et al. |
| 2012/0287323 A1 | 11/2012 | Border et al. |
| 2012/0313930 A1 | 12/2012 | Yun et al. |
| 2013/0033503 A1 | 2/2013 | Besnard et al. |
| 2013/0033700 A1 | 2/2013 | Hallil |
| 2013/0035538 A1 | 2/2013 | Maestu Unturbe et al. |
| 2013/0100113 A1 | 4/2013 | Seo et al. |
| 2013/0100122 A1 | 4/2013 | Moon et al. |
| 2013/0113894 A1 | 5/2013 | Mirlay |
| 2013/0135319 A1 | 5/2013 | Ma et al. |
| 2013/0141308 A1 | 6/2013 | Huang et al. |

(56) References Cited

U.S. PATENT DOCUMENTS

| | | |
|---|---|---|
| 2013/0141653 A1 | 6/2013 | Lee et al. |
| 2013/0168987 A1 | 7/2013 | Valentino et al. |
| 2013/0176237 A1 | 7/2013 | Chu |
| 2013/0182068 A1 | 7/2013 | Cheng et al. |
| 2013/0196038 A1 | 8/2013 | Liu |
| 2013/0218508 A1 | 8/2013 | Jindal |
| 2013/0227175 A1 | 8/2013 | Ting |
| 2013/0232108 A1 | 9/2013 | Bostick et al. |
| 2013/0257841 A1 | 10/2013 | Shim et al. |
| 2013/0258040 A1 | 10/2013 | Kaytaz et al. |
| 2013/0272510 A1 | 10/2013 | Mittal |
| 2013/0273878 A1 | 10/2013 | Heo et al. |
| 2013/0285881 A1 | 10/2013 | Loo et al. |
| 2013/0293707 A1 | 11/2013 | Kwong |
| 2014/0002600 A1 | 1/2014 | Kim et al. |
| 2014/0012100 A1 | 1/2014 | Al-Ali et al. |
| 2014/0029512 A1 | 1/2014 | Chu et al. |
| 2014/0040024 A1 | 2/2014 | Sitbon |
| 2014/0078147 A1 | 3/2014 | Uchiyama |
| 2014/0078439 A1 | 3/2014 | Zhong |
| 2014/0109041 A1 | 4/2014 | Yunten |
| 2014/0113658 A1 | 4/2014 | Jin et al. |
| 2014/0135868 A1 | 5/2014 | Bashyam |
| 2014/0143671 A1 | 5/2014 | Kovalick |
| 2014/0156257 A1 | 6/2014 | Jephcott |
| 2014/0159921 A1 | 6/2014 | Qualey et al. |
| 2014/0168392 A1 | 6/2014 | Kang et al. |
| 2014/0177032 A1 | 6/2014 | Woodgate et al. |
| 2014/0178027 A1 | 6/2014 | Lee |
| 2014/0185755 A1 | 7/2014 | Bendahan |
| 2014/0192281 A1 | 7/2014 | Smithwick et al. |
| 2014/0196076 A1 | 7/2014 | Kim et al. |
| 2014/0198219 A1 | 7/2014 | Chuang et al. |
| 2014/0210699 A1 | 7/2014 | Liu et al. |
| 2014/0213364 A1 | 7/2014 | Tahtouh |
| 2014/0222676 A1 | 8/2014 | Lee et al. |
| 2014/0223693 A1 | 8/2014 | Hsu |
| 2014/0223694 A1 | 8/2014 | Hsu |
| 2014/0226214 A1 | 8/2014 | Edwards et al. |
| 2014/0233907 A1 | 8/2014 | Anderson et al. |
| 2014/0236565 A1 | 8/2014 | Kuwahara |
| 2014/0240601 A1 | 8/2014 | Macleod |
| 2014/0247038 A1 | 9/2014 | Wu et al. |

\* cited by examiner

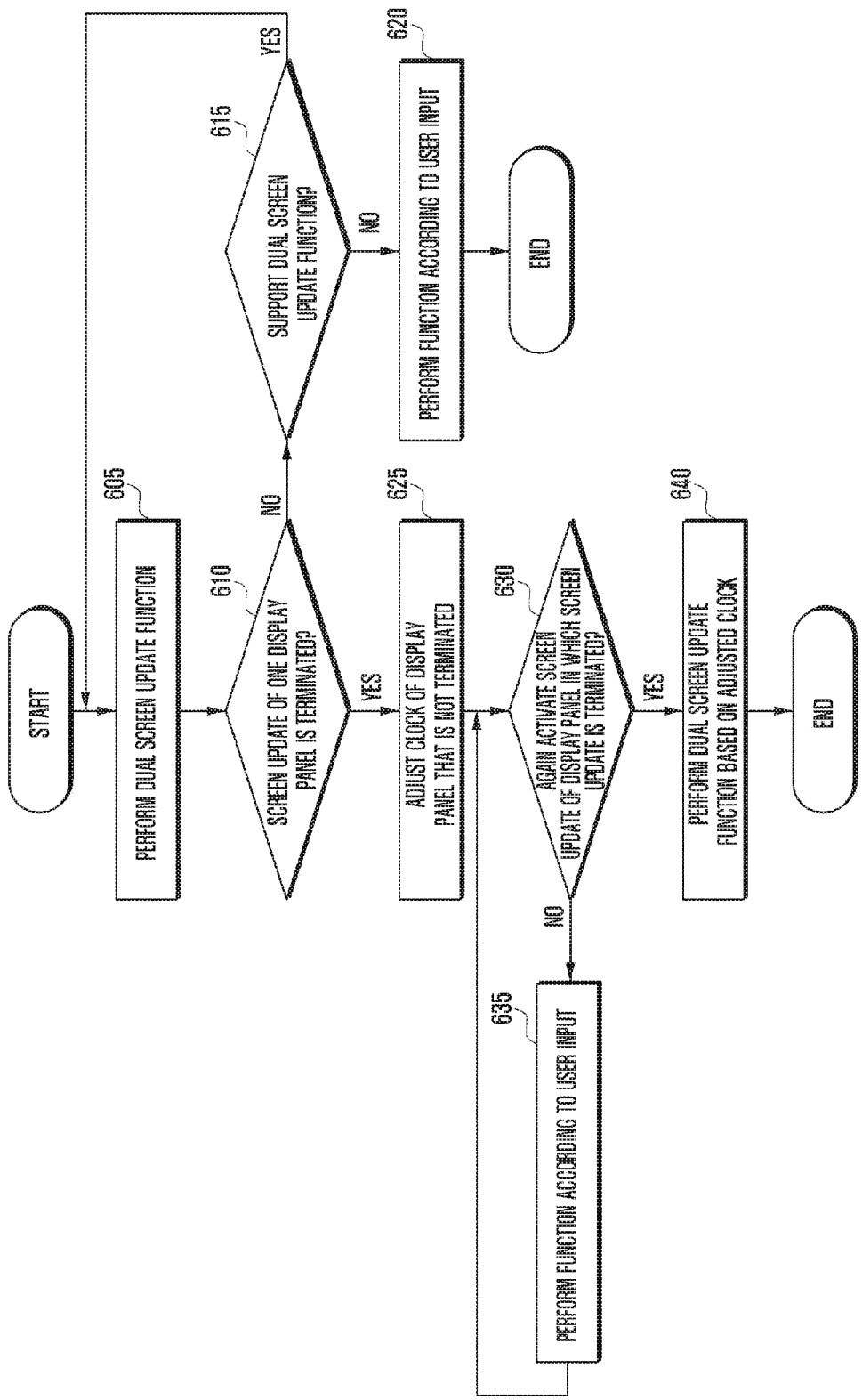

ELECTRONIC DEVICE AND METHOD OF UPDATING SCREEN OF DISPLAY PANEL THEREOF

CROSS-REFERENCE TO RELATED APPLICATION(S)

This application claims the benefit under 35 U.S.C. §119(a) of a Korean patent application filed on Mar. 18, 2015 in the Korean Intellectual Property Office and assigned Serial number 10-2015-0037293, the entire disclosure of which is hereby incorporated by reference.

TECHNICAL FIELD

The present disclosure relates to a method of synchronizing screen update in each display panel by controlling a plurality of display panels and an electronic device that supports the same.

BACKGROUND

As an electronic component has high sensitivity, a small size, and a light weight, electronic devices such as a mobile terminal are being formed in a small size and have various functions according to a consumer's desire. Presently, an electronic device includes a plurality of display panels, thereby providing various interfaces to a user.

In general, an electronic device having a plurality of display panels operates a display panel using a mobile industry processor interface (MIPI) method, which is an example of a display interface. An MIPI is a reference for prescribing an interface between respective elements constituting a mobile device. An electronic device using the MIPI method generally uses an MIPI VIDEO mode, which is an asynchronous communication method. Because an electronic device using an MIPI VIDEO mode performs an output of each display panel regardless of whether screen update is performed in the each display panel, a frame overlap phenomenon according to driving of a plurality of display panels does not generally become a problem.

An electronic device having a plurality of display panels may operate a display panel through an MIPI COMMAND mode unlike the above method. An electronic device using the MIPI COMMAND mode controls screen update in a display panel only when a screen update is required. Therefore, an MIPI COMMAND mode requires a somewhat complicate control, but has an advantage in consumption power, compared with an MIPI VIDEO mode.

An electronic device using an MIPI COMMAND mode synchronizes a screen of each display panel using a tearing effect (TE) signal between a processor and the each display panel. When operating a physically different plurality of display panels, it is difficult to perform synchronization for screen update due to a difference between TE signals occurring in each display panel.

Further, because screen update in each display panel is not simultaneously performed, a frame overlap phenomenon or a frame drop phenomenon may periodically occur in a plurality of display panels.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method in which an electronic device operating a plurality of display panels using a mobile industry processor interface (MIPI) COMMAND mode controls a tearing effect (TE) signal in each display panel to synchronize screen update.

Various embodiments of the present disclosure further provide a method in which a plurality of display panels control to share only one external clock without using each internal clock in a corresponding display panel.

In accordance with an aspect of the present disclosure, an electronic device is provided. The electronic device includes a first display panel including a first clock generator and configured to generate a first TE signal according to the first clock generator in response to a screen update request signal, a second display panel including a second clock generator and configured to generate a second TE signal according to the second clock generator in response to the screen update request signal, and a controller that transmits the screen update request signal to the first display panel and the second display panel and that receives the first TE signal and the second TE signal and that compares the first TE signal and the second TE signal to adjust a clock of at least one of the first clock generator and the second clock generator.

In accordance with another aspect of the present disclosure, an electronic device is provided. The electronic device includes an external clock generator, a first display panel configured to generate a first TE signal in response to a screen update request signal, a second display panel configured to generate a second TE signal in response to the screen update request signal, and a controller configured to transmit the screen update request signal to the first display panel and the second display panel, and control the first display panel and the second display panel to generate the first TE signal and the second TE signal according to the external clock generator.

In accordance with another aspect of the present disclosure, a method of updating a screen of a display panel in an electronic device including a first display panel including a first clock generator and a second display panel including a second clock generator is provided. The method includes transmitting, by a controller, a screen update request signal to the first display panel and the second display panel, receiving, by the controller, a first TE signal generated according to the first clock generator from the first display panel, receiving, by the controller, a second TE signal generated according to the second clock generator from the second display panel, and comparing, by the controller, the first TE signal and the second TE signal and adjusting a clock of at least one of the first clock generator and the second clock generator.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features and advantages of certain embodiments of the present disclosure will be more apparent from the following description in conjunction with the accompanying drawings, in which:

FIG. 6 is a flowchart illustrating a method in which an electronic device adjusts a clock of another display panel when a screen update of a specific display panel is terminated according to an embodiment of the present disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A tearing effect (TE) signal described in the present disclosure may be a signal fed back from a display unit or a processor integrated circuit (IC) of the display unit to a controller. The TE signal may represent a non-display period state between a frame and a frame. However, a signal described in the present disclosure is not limited to the TE signal, and an electronic device according to various embodiments of the present disclosure may collect and use at least one signal that can generate according to operation of a clock generator.

Figure 1:
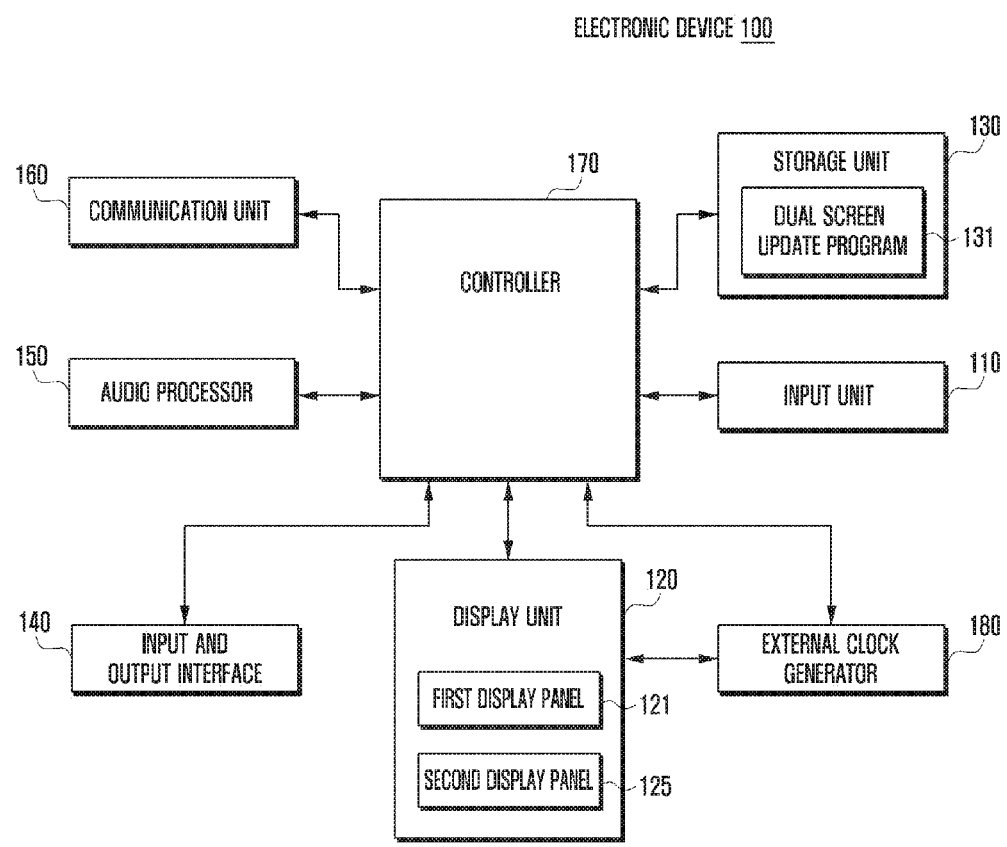
FIG. 1 is a block diagram illustrating a configuration of an electronic device according to an embodiment of the present disclosure.

FIG. 1 is a block diagram illustrating a configuration of an electronic device 100 according to an embodiment of the present disclosure.

According to an embodiment of the present disclosure, the electronic device 100 may include an input unit 110, display unit 120, storage unit 130, input and output interface 140, audio processor 150, communication unit 160, controller 170, and external clock generator 180.

The electronic device 100 may include additional elements or fewer elements than those shown in FIG. 1.

FIG. 1 illustrates a configuration in which one electronic device 100 includes two display panels, but it is not limited thereto. For example, the electronic device 100 may control a plurality of other electronic devices each including one display panel. The electronic device 100 may be implemented with a server or a device that transmits a clock control signal to a plurality of terminals.

The electronic device 100 may include at least one of, for example a smart phone, tablet personal computer (tablet PC), mobile phone, video phone, e-book reader, desktop PC, laptop PC, netbook computer, workstation, server, personal digital assistant (PDA), portable multimedia player (PMP), Moving Picture Experts Group phase 1 or phase 2 (MPEG-1 or MPEG-2) audio layer-3 (MP3) player, mobile medical device, camera, or wearable device. However, the electronic device 100 is not limited thereto and the electronic device 100 may include various forms of devices having at least two display panels.

The input unit 110 may receive an input of numeral or character information and include a plurality of input keys and function keys for setting various functions. Function keys may include a direction key, side key, and hotkey set to perform a specific function. The input unit 110 may generate a key signal input in relation to user setting and a function control of the electronic device 100 and transmit the key signal to the controller 170. The input unit 110 may be implemented with a touch screen method. A touch screen may be formed with a liquid crystal display (LCD) and an organic light emitted diode (OLED) and may be included in the input unit 110. For example, the input unit 110 may include a panel, sheet, or digitizer that can receive a general touch input, proximity touch input, gesture input, or electronic pen input. The input unit 110 may receive an instruction input for activating a function of a dual screen update program from a user.

The display unit 120 may display various screens occurring when operating the electronic device 100. The display unit 120 may receive a display control signal of a specific screen from the controller 170 and output the display control signal on a screen. For example, the display unit 120 may provide a screen interface such as a home screen, standby screen, menu screen, or communication screen. The display unit 120 may be implemented with a touch screen, and when the display unit 120 is implemented with a touch screen method, a screen of the display unit 120 may be operated as the input unit 110. Further, the input unit 110 and the display unit 120 may be implemented with a touch display screen.

In FIG. 1, the display unit 120, the storage unit 130, and the controller 170 are illustrated as a separate element, but are not limited to this arrangement. For example, the display unit 120, the storage unit 130, and the controller 170 may be formed in a module and may be formed in a display or a display module including a processor and a memory. The display module may be implemented in an integrated circuit (IC) form such as an LCD Driver IC (LDI) or a display driver IC (DDI) or in a system on chip (SOC) form. However, the display unit 120, the storage unit 130, and the controller 170 are not limited to be always formed in a module. For example, the display module may include at least one of the display unit 120, the storage unit 130, and the controller 170.

The display unit 120 according to various embodiments of the present disclosure may include a first display panel 121 and a second display panel 125. As shown in FIG. 1, the first display panel 121 and the second display panel 125 are included in the display unit 120, but it is not limited thereto. For example, the first display panel 121 and the second display panel 125 may each be an independent module constituting one display unit.

Figure 2:
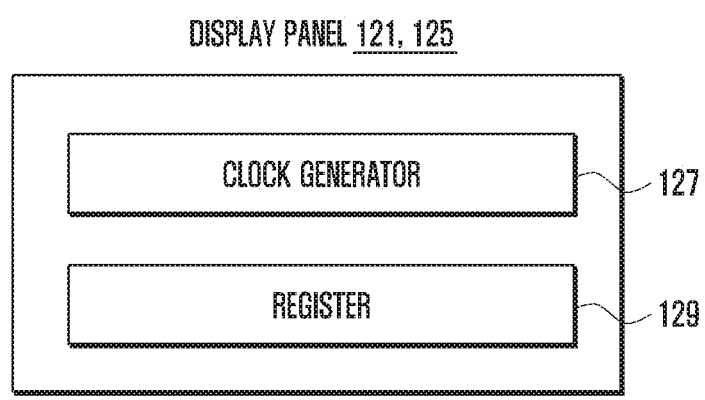
FIG. 2 is a block diagram illustrating a configuration of a display panel according to an embodiment of the present disclosure.

FIG. 2 is a block diagram illustrating an internal configuration of a first display panel or a second display panel according to an exemplary embodiment of the present disclosure.

Referring to FIG. 2, the first display panel 121 or the second display panel 125 may include a clock generator 127 and a register 129. According to a configuration of FIG. 2, the first display panel 121 may include a first clock generator and a first register, and the second display panel 125 may include a second clock generator and a second register.

Although not shown in FIG. 2, the first display panel 121 or the second display panel 125 may further include a processor that controls the clock generator 127 and the register 129. The first display panel 121 or the second display panel 125 may support various configurations for supporting at least one of a resistive method, capacitive method, infrared ray method, and electromagnetic induction method. For example, the first display panel 121 or the second display panel 125 may stack at least one sheet or film thereon and may have an electric circuit to generate an electric field or a magnetic field.

According to an embodiment of the present disclosure, the display panels 121 and 125 may receive an electrical pulse from the clock generator 127 with a constant interval to output a frame. The display panels 121 and 125 may generate a TE signal according to the clock generator 127.

According to an embodiment of the present disclosure, the register 129 may temporarily store a frame provided from the storage unit 130 by the controller 170. The register 129 may provide the temporarily stored frame to a screen under the control of the controller 170 or a processor (not shown) within the display panel. The register 129 may temporarily store a TE signal generated by the clock generator 127.

According to various embodiments of the present disclosure, the register 129 may support to adjust a clock of the display panels 121 and 125 according to a control signal of the controller 170.

In the present disclosure, the display unit 120 includes only the first display panel and the second display panel, but embodiments of the present disclosure are not limited thereto. For example, the display unit 120 according to various embodiments of the present disclosure may include at least three display panels and adjust a clock of corresponding display panels based on TE signals generating in the corresponding display panels.

The storage unit 130 may store an instruction or data received from the controller 170 or other elements. The storage unit 130 may store an instruction or data generated by the controller 170 or other elements. The storage unit 130 may include programming modules, for example kernel, middleware, an application programming interface (API), or an application. The foregoing respective programming modules may be formed with software, firmware, hardware, or a combination of at least two thereof. The storage unit 130 may include a memory, cache, and buffer.

According to various embodiments of the present disclosure, the storage unit 130 may store a dual screen update program 131. The dual screen update program 131 may be a configuration that supports a dual screen update function of the present embodiment. The dual screen update program 131 may include a routine that supports activation or deactivation of a dual screen update function. The dual screen update program 131 may include a routine that receives and compares an input of a TE signal from each display panel when a dual screen update function mode is activated. Further, the dual screen update program 131 may include a routine that transmits a clock control signal that can adjust a clock of at least one of respective display panels to a corresponding display panel.

The input and output interface 140 may perform a function of an interface that can transfer an instruction or data input from, for example, a user or other external devices to other element(s) of the electronic device 100. Further, the input and output interface 140 may output an instruction or data received from other element(s) of the electronic device 100 to a user or other external devices.

The audio processor 150 may process various audio signals occurring in an operation process of the electronic device 100. For example, the audio processor 150 may include a speaker to support an audio signal output generated or decoded in the electronic device 100. Further, in order to support an audio dedicated communication or audiovisual communication function and a recording function, the audio processor 150 may include a microphone that can collect an audio signal.

According to various embodiments of the present disclosure, the audio processor 150 may output a notification sound (e.g., effect sound or guidance sound) according to an activation or deactivation state of a dual screen update function.

The communication unit 160 may perform a communication connection to other electronic devices or a server connected to the electronic device 100 through a network and may perform data transmission and reception. The communication unit 160 may include, for example a cellular module, Wi-Fi module, Bluetooth (BT) module, global positioning system (GPS) module, near filed communication (NFC) module, mobile network module, or radio frequency (RF) module.

The controller 170 may perform a data processing function that controls general operations such as a power supply control of the electronic device 100 and signal flow between internal elements of the electronic device 100 and that processes data. The controller 170 may be formed in a central processing unit (CPU) or an application processor (AP). In various embodiments of the present disclosure, in order to compare TE signals received from a plurality of display panels and to adjust a clock of at least one display panel, the controller 170 may control respective elements of the electronic device 100.

The external clock generator 180 may be a clock generator that is not included in the first display panel 121 and the second display panel 125. For example, the external clock generator 180 may be formed separately from the first display panel 121 and the second display panel 125 and may be an element included in the electronic device 100. The external clock generator 180 may supply an electrical signal to the first display panel 121 and the second display panel 125 under the control of the controller 170.

According to various embodiments of the present disclosure, in order to enable the first display panel 121 and the second display panel 125 to receive an electrical pulse from the external clock generator 180 and to generate a TE signal, the controller 170 may control at least one of the first display panel 121, the second display panel 125, and the external clock generator 180.

According to various embodiments of the present disclosure, the first display panel 121 and the second display panel 125 may directly receive a signal from the external clock generator 180 under the control of the controller 170.

The electronic device 100 according to various embodiments of the present disclosure may support a synchronization function of screen update using a hardware characteristic.

According to an embodiment of the present disclosure, the electronic device 100 may include the external clock generator 180, the first display panel 121 that generates a first TE signal in response to a screen update request, the second display panel 125 that generates a second TE signal in response to a screen update request, and the controller 170 that controls the first display panel and the second display panel to generate the first TE signal and the second TE signal according to the external clock generator 180. The first display panel 121 and the second display panel 125 may omit the clock generator 127, unlike the example shown in FIG. 2. In this case, the first display panel 121 and the second display panel 125 may directly receive an electrical vibration signal from the external clock generator 180 under the control of an internal processor or the controller 170. Further, the electronic device 100 according to various embodiments of the present disclosure may be formed with a module including the first display panel 121, the second display panel 125, and the external clock generator 180. The first display panel 121 and the second display panel 125 operate by one external clock generator 180, thereby synchronizing screen update.

The electronic device 100 according to various embodiments of the present disclosure may support a synchronization function of screen update using a software characteristic.

According to an embodiment of the present disclosure, as shown in FIG. 2, even when the first display panel 121 and the second display panel 125 include the clock generator 127, the first display panel 121 and the second display panel 125 may receive an electrical vibration signal from the external clock generator 180.

According to an embodiment of the present disclosure, in order to deactivate the first clock generator and the second clock generator and to generate the first TE signal and the second TE signal according to the external clock generator included in the electronic device 100, the controller 170 may control the first display panel 121 and the second display panel 125.

Various embodiments that adjust a clock of each display panel based on a TE signal, which is a feedback signal of each display panel are described below. Although not required, in the examples given it is assumed that a signal generating in each display panel is a TE signal.

Figure 3:
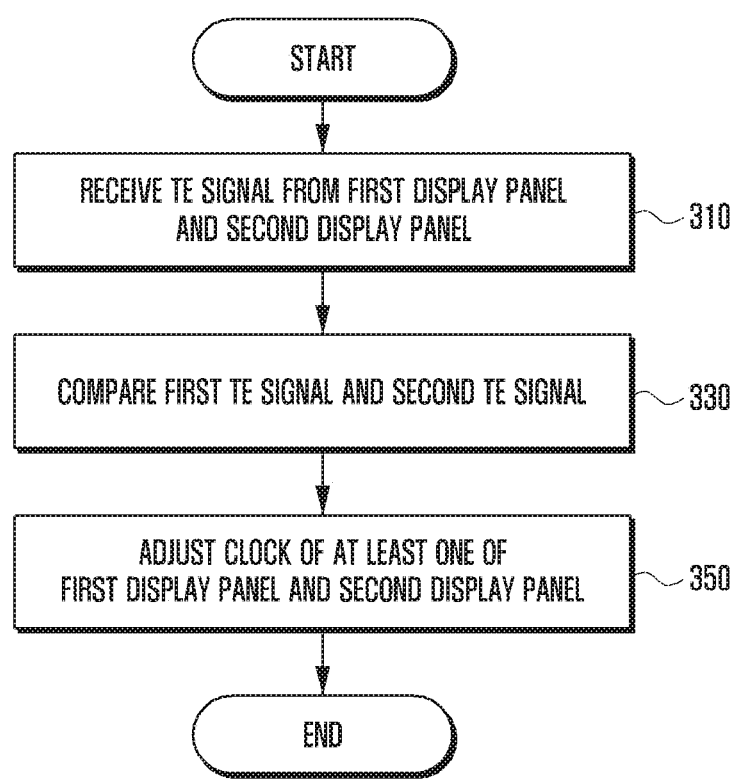
FIG. 3 is a flowchart illustrating a method in which an electronic device adjusts a clock of a display panel according to an embodiment of the present disclosure.

FIG. 3 is a flowchart illustrating a method in which an electronic device adjusts a clock of a display panel according to an embodiment of the present disclosure.

Referring to FIG. 3, it is assumed that the electronic device 100 includes two display panels, i.e., a first display panel and a second display panel.

According to an embodiment of the present disclosure, the electronic device 100 may receive a signal (e.g., TE signal) from the first display panel and the second display panel at operation 310. For example, the electronic device 100 may receive a first signal and a second signal from the first display panel and the second display panel, respectively. The first signal and the second signal may be a first TE signal and a second TE signal, respectively. The first TE signal and the second TE signal may be differently generated according to a clock cycle or the clock number of a clock generator included in each display panel.

According to various embodiments of the present disclosure, a first clock generator included in the first display panel 121 may generate a first signal, for example a first TE signal, in response to a screen update request. The screen update request may be a signal in which the controller 170 transmits to the first display panel 121 in order to output a specific image frame in an MIPI COMMAND mode. When a first TE signal occurs in the first display panel 121, the controller 170 may receive the first TE signal generated in the first display panel 121 and store the first TE signal at the storage unit 130 such as a buffer or a memory.

A second clock generator included in the second display panel 125 may generate a second signal, for example a second TE signal, in response to a screen update request. The screen update request may be a signal in which the controller 170 transmits to the second display panel 125 in order to output a specific image frame in an MIPI COMMAND mode. When a second TE signal occurs in the second display panel 125, the controller 170 may receive a second TE signal generated in the second display panel 125 and store the second TE signal at the storage unit 130 such as a buffer or a memory.

According to an embodiment of the present disclosure, the electronic device 100 may compare a first signal and a second signal at operation 330. For example, the controller 170 may compare a first TE signal and a second TE signal. The electronic device 100 may measure an error value between a first TE signal and a second TE signal and store the measured error value at the storage unit 130. The controller 170 may calculate an error value between a first TE signal and a second TE signal and determine whether the calculated error value exceeds a predetermined threshold value. The error value may be previously set by a user or may be automatically set by a physical characteristic of the electronic device 100 or a policy.

According to an embodiment of the present disclosure, the electronic device 100 may adjust a clock of at least one of the first display panel and the second display panel at operation 350. The electronic device 100 may adjust a clock of at least one of the first display panel and the second display panel based on a comparison result of a first TE signal and a second TE signal. For example, the electronic device 100 may adjust a clock of at least one of the first display panel and the second display panel based on an error value between a first TE signal and a second TE signal.

According to various embodiments of the present disclosure, the controller 170 of the electronic device 100 may transmit a clock control signal to at least one of the first display panel 121 and the second display panel 125. For example, the controller 170 may transmit a clock control signal to the register 129, and the register 129 may adjust a clock of the clock generator 127 according to the received clock control signal. The clock control signal may be a signal that controls to reduce or increase a cycle of a clock generator included in a corresponding display panel. By updating the register 129 that can adjust a clock of each display panel, the controller 170 may adjust a clock of each display panel. At least one of the first display panel 121 and the second display panel 125 may generate a TE signal or a frame per seconds (FPS) signal according to an adjusted clock.

According to various embodiments of the present disclosure, the controller 170 may adjust a clock of at least one of the first display panel 121 and the second display panel 125 by a proportional-integral-derivative (PID) control method. For example, the electronic device 100 may detect a manipulation amount based on various variables (e.g., TE signal cycle, voltage information, current information, and data information) that may be collected in each display panel using a PID control method. The controller 170 may generate a control signal based on a frequency table that stores a calculated manipulation amount and a frequency mapped thereto. The frequency table may be previously stored at the storage unit 130 by a user setting input. A manipulation amount and a frequency corresponding thereto may be set by an experimentally obtained value or a user input. The controller 170 may generate a control signal based on a frequency value mapped to the calculated manipulation amount.

Figure 4:
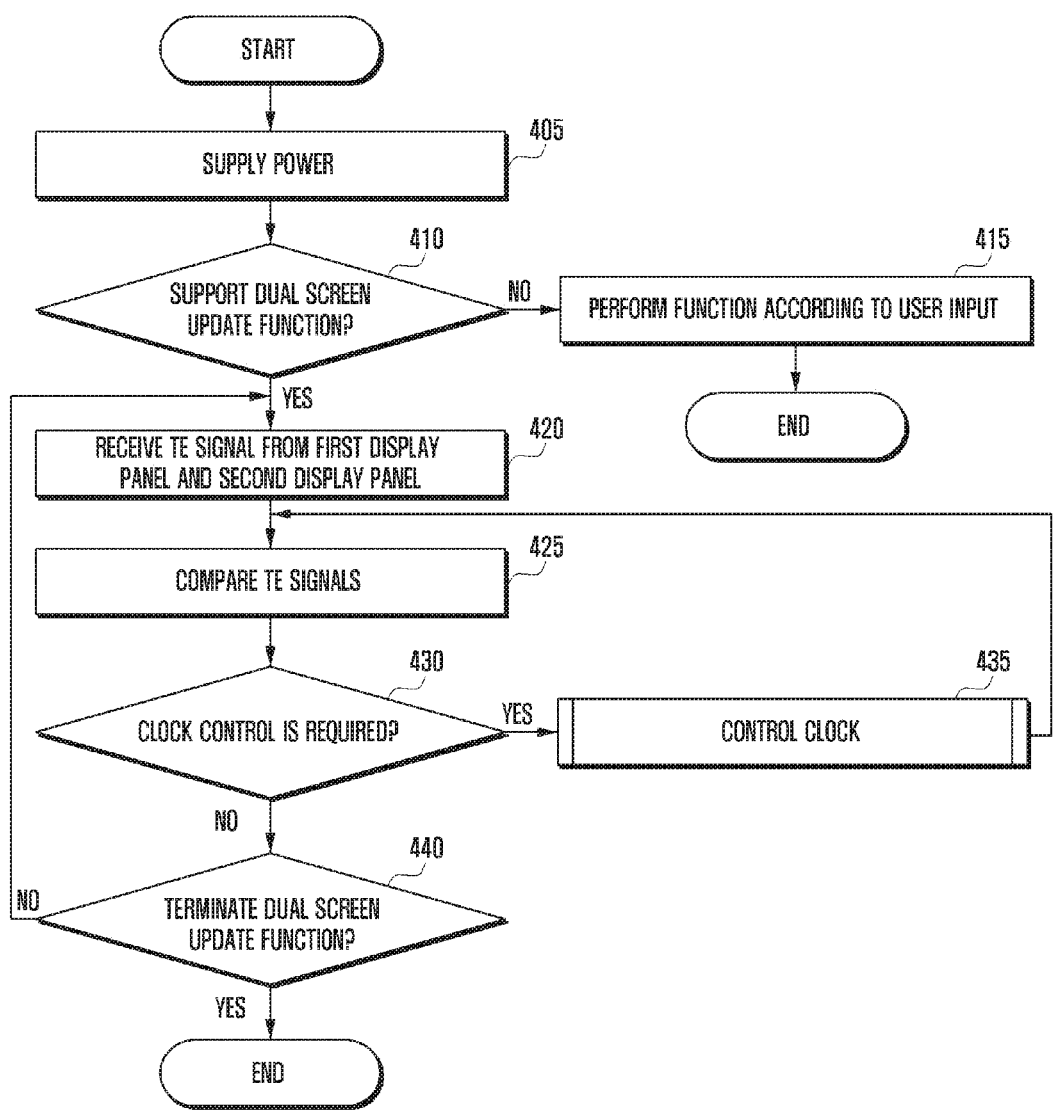
FIG. 4 is a flowchart specifically illustrating a method in which an electronic device adjusts a clock of a display panel according to an embodiment of the present disclosure.

FIG. 4 is a flowchart specifically illustrating a method in which an electronic device adjusts a clock of a display panel according to an embodiment of the present disclosure.

Referring to FIG. 4, the controller 170 may supply power to the electronic device 100 at operation 405. For example, when a user inputs a specific key, the electronic device 100 may receive power from a power supply device such as a battery to boot a system. The electronic device 100 may operate various functions by the supplied power and support a dual screen update function according to various embodiments of the present disclosure.

According to an embodiment of the present disclosure, the controller 170 may determine whether the electronic device 100 supports a dual screen update function at operation 410. For example, the controller 170 may determine whether to operate a plurality of display panels using an MIPI COMMAND mode. The dual screen update function may be performed by a user's specific input, for example an input for outputting a specific content in a plurality of display panels. By determining whether the entire of a plurality of display panels performs a screen update operation, the controller 170 may determine whether the electronic device 100 supports a dual screen update function. For example, when only any one of the first display panel 121 and the second display panel 125 performs screen update, a frame overlap phenomenon or a frame drop phenomenon does not occur, and thus the electronic device 100 may not support a dual screen update function. However, when only any one of the first display panel 121 and the second display panel 125 performs screen update (e.g., when any one display panel is turned off), the controller 170 may adjust a clock of a display panel that is not turned off. An exemplary embodiment is described below with reference to FIG. 6.

If the electronic device 100 does not support a dual screen update function, the electronic device 100 may perform a function according to a user input at operation 415. For example, the electronic device 100 may perform various functions such as a standby screen display and a lock mode corresponding to a user's specific input.

If the electronic device 100 supports a dual screen update function, the electronic device 100 may receive a TE signal from the first display panel 121 and the second display panel 125 at operation 420. For example, the controller 170 may receive respective TE signals occurring in the first display panel 121 and the second display panel 125. The first display panel 121 and the second display panel 125 may be included in one electronic device or may be included in respective electronic devices.

According to an embodiment of the present disclosure, the electronic device 100 may compare TE signals at operation 425. For example, the controller 170 may detect an error value between a first TE signal and a second TE signal and store the detected error value at the storage unit 130. Respective TE signals received in the first display panel 121 and the second display panel 125 may be different in a time received based on the controller 170. The controller 170 may detect an error value according to the time difference.

According to an embodiment of the present disclosure, the electronic device 100 may determine whether a clock control of the display panel is required at operation 430.

According to various embodiments of the present disclosure, the controller 170 may determine whether an error value detected at operation 425 is equal to or less than a predetermined value. The determination operation may be performed by the controller 170 in a constant cycle, and a predetermined value may be set by a user.

If a detected error value is equal to or less than a predetermined value, the electronic device 100 may determine that a clock control of the display panel is not required. Accordingly, the electronic device 100 may determine whether to terminate a dual screen update function at operation 440. The determination operation may be determined according to a user input or a predetermined routine.

If a function termination instruction is received, the electronic device 100 may terminate a function operation. If a function termination instruction is not received, the process returns to operation 420 and the electronic device 100 may receive a TE signal from the first display panel and the second display panel.

If a clock control of the display panel is required at operation 430, the electronic device 100 may control a clock of the display panel at operation 435. For example, if an error value detected at operation 425 exceeds a predetermined value, the controller 170 may control a clock of at least one of the first display panel and the second display panel. The control operation is described in detail in a description of FIG. 5 to be described later.

Figure 5:
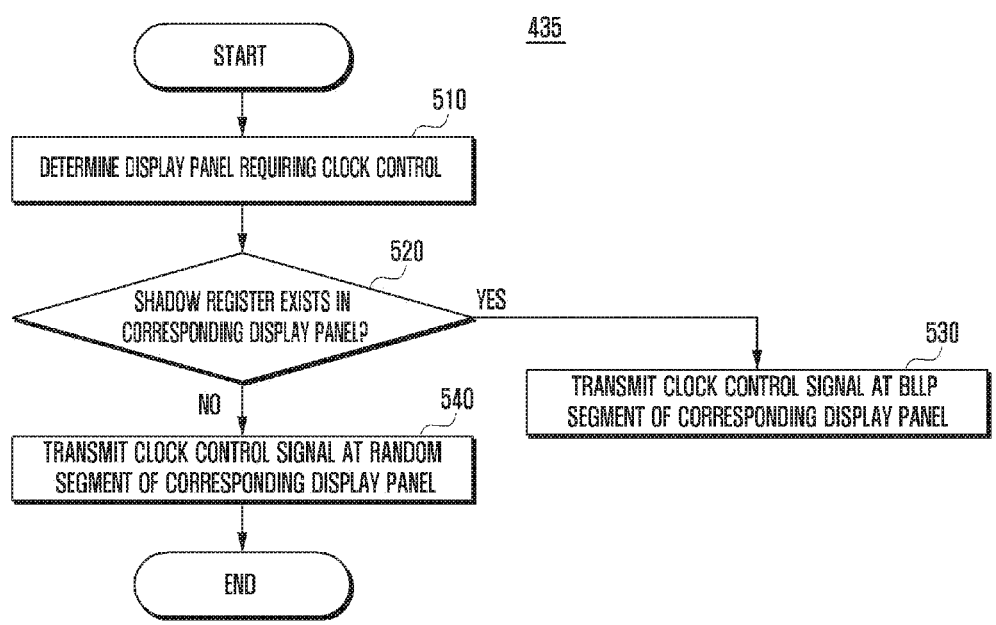
FIG. 5 is a flowchart illustrating an operation in which an electronic device controls a clock of a display panel according to an embodiment of the present disclosure.

FIG. 5 is a flowchart illustrating an operation in which an electronic device controls a clock of a display panel according to an embodiment of the present disclosure.

Referring to FIG. 5, the electronic device 100 may determine a display panel requiring a clock control at operation 510. For example, the controller 170 may determine whether a TE signal received from the first display panel and the second display panel at a random time is faster than or slower than another TE signal. The controller 170 may adjust a display panel that generates a TE signal more quickly or may adjust a display panel that generates a TE signal more slowly. The adjustment operation may be determined according to user setting or system setting.

According to an embodiment of the present disclosure, the electronic device 100 may determine whether a shadow register exists in a corresponding display panel at operation 520. The shadow register may be included in the register 129 of FIG. 2.

If a shadow register does not exist in a corresponding display panel, the electronic device 100 may transmit a clock control signal at a blanking or low power internal (BLLP) segment of the corresponding display panel at operation 540. For example, when the first display panel and the second display panel do not include a shadow register, the controller 170 may transmit a clock control signal at a BLLP segment of the first display panel 121 or the second display panel 125. Further, the controller 170 may transmit a control signal that changes FPS at the BLLP segment independently from video data. Accordingly, the controller 170 may perform a screen update operation without an error in an MIPI Command mode.

If a shadow register exists in a corresponding display panel, the electronic device 100 may transmit a clock control signal at a random segment of the corresponding display panel at operation 530. For example, when the first display panel 121 and the second display panel 125 include a shadow register, the controller 170 may transmit a control signal to a corresponding display panel at even another segment (e.g., a random time point) as well as a BLLP segment.

FIG. 6 is a flowchart illustrating a method in which an electronic device adjusts a clock of another display panel when screen update of a specific display panel is terminated according to an embodiment of the present disclosure.

Referring to FIG. 6, the electronic device 100 may perform a dual screen update function at operation 605. The dual screen update function is described above with reference to FIGS. 3 to 5.

According to an embodiment of the present disclosure, the electronic device 100 may determine whether screen update of one display panel is terminated at operation 610.

According to various embodiments of the present disclosure, the controller 170 may transmit a control signal that turns off a first clock generator or a second clock generator to any one of the first display panel 121 and the second display panel 125. The electronic device 100 may provide a clock off function for reducing a consumption current, and thus a screen update operation of at least one of the first display panel 121 and the second display panel 125 may be stopped.

The controller 170 may determine whether screen update of any one of the first display panel 121 and the second display panel 125 is terminated according to a user input or a system operation.

When screen update of any one display panel is not terminated (e.g., when screen update of an entire display panel is terminated or when screen update of an entire display panel operates), the controller 170 may determine whether the electronic device 100 supports a dual screen update function at operation 615.

If the electronic device 100 supports a dual screen update function, the process returns to operation 605 and the electronic device 100 may perform a dual screen update function. For example, when a screen update operation of the first display panel and the second display panel is performing and when an error value between respective TE signals exceeds a predetermined value, the controller 170 may determine to support a dual screen update function.

If the electronic device 100 does not support a dual screen update function, the electronic device 100 may perform a function according to a user input at operation 620. For example, while a screen update operation of the first display panel and the second display panel is performing, but when an error value between respective TE signals is equal to or less than a predetermined value, the electronic device 100 may provide an application or content according to a user input.

According to an embodiment of the present disclosure, if screen update of any one display panel is terminated, the electronic device 100 may adjust a clock of a display panel that is not terminated at operation 625. For example, the controller 170 may adjust a clock of a display panel in which screen update is not terminated in the first display panel and the second display panel to a predetermined value. As an example, the controller 170 may adjust a clock of a display panel in which screen update is not terminated to 60 HZ.

According to an embodiment of the present disclosure, the electronic device 100 may determine whether to again activate screen update of a display panel in which screen update is terminated at operation 630.

If screen update of a display panel in which screen update is terminated is not again activated, the electronic device 100 may perform a function according to a user input by a user request at operation 635.

If screen update of a display panel in which screen update is terminated is again activated, the electronic device 100 may perform a dual screen update function based on a previously adjusted clock at operation 640. The controller 170 may adjust a clock of the activated (ON) display panel based on an adjusted clock at operation 625. For example, when an adjusted clock of the display panel is 60 HZ at operation 625, the controller 170 may adjust a clock of a corresponding display panel so that a clock of the actuated display panel is adjacent to 60 HZ. In this case, the controller 170 may transmit a clock control signal to the activated display panel.

According to an embodiment of the present disclosure, after screen update of any one display panel is terminated, when screen update of a plurality of display panels is again performed, the electronic device 100 according to various embodiments of the present disclosure can more quickly provide synchronization of screen update.

Figure 7A:
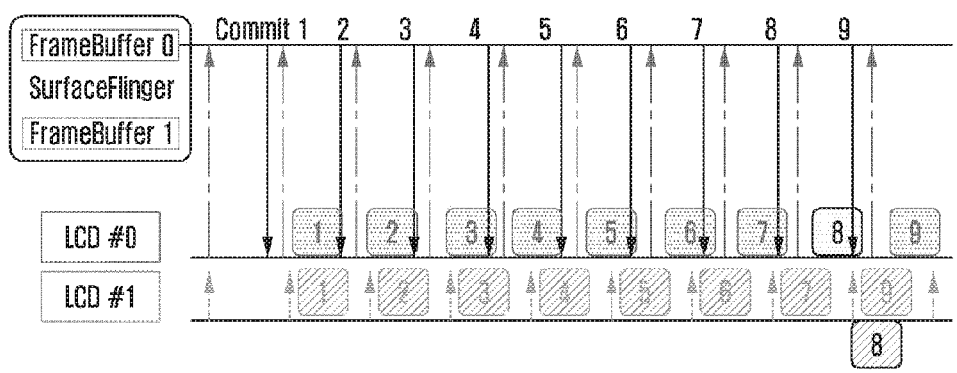
FIGS. 7A and 7B are diagrams illustrating a frame overlap phenomenon and a frame drop phenomenon occurring in a dual display panel using a mobile industry processor interface (MIPI) COMMAND method according to the related art.
Figure 7B:
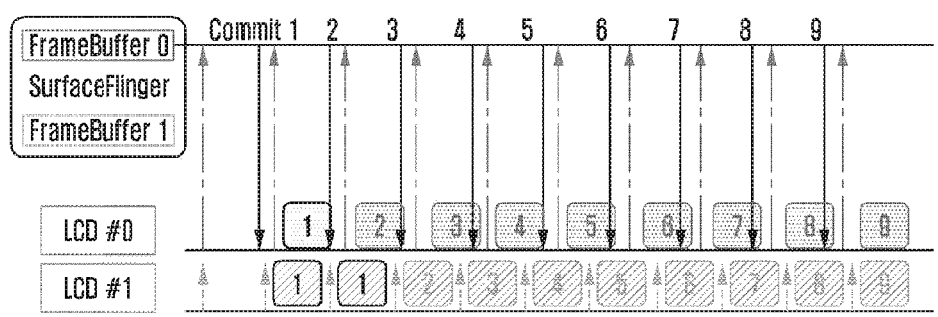

FIGS. 7A and 7B are diagrams illustrating a frame overlap phenomenon and a frame drop phenomenon occurring in a dual display panel using a MIPI COMMAND method, according to the related art.

Referring to FIG. 7A, the controller 170 transmits a signal for screen update of a first display panel LCD #0 and a second display panel LCD #1. Accordingly, the first display panel LCD #0 and the second display panel LCD #1 transmit a TE signal, which is a feedback signal to the controller. In each display panel of the first display panel LCD #0 and the second display panel LCD #1, due to a hardware characteristic, a time point that performs actual update is different. Because a cycle of a feedback signal according to each clock generator is different, a frame drop phenomenon occurs in which the second display panel LCD #1 does not output an eighth frame.

Referring to FIG. 7B, the first display panel LCD #0 and the second display panel LCD #1 transmit a TE signal, which is a feedback signal to the controller 170 in response to a screen update signal of the controller 170. Because a cycle of a feedback signal according to each clock generator is different, in the second display panel LCD #1, a frame overlap phenomenon occurs in which a first frame is output twice.

Because a frame overlap phenomenon or a frame drop phenomenon occurring in FIGS. 7A and 7B occurs due to a hardware characteristic of each display panel, it may be difficult to completely adjust an error. Therefore, various embodiments of the present disclosure have an object that mitigates the phenomenon to a level in which a user does not recognize the phenomenon in a real life.

Figure 8A:
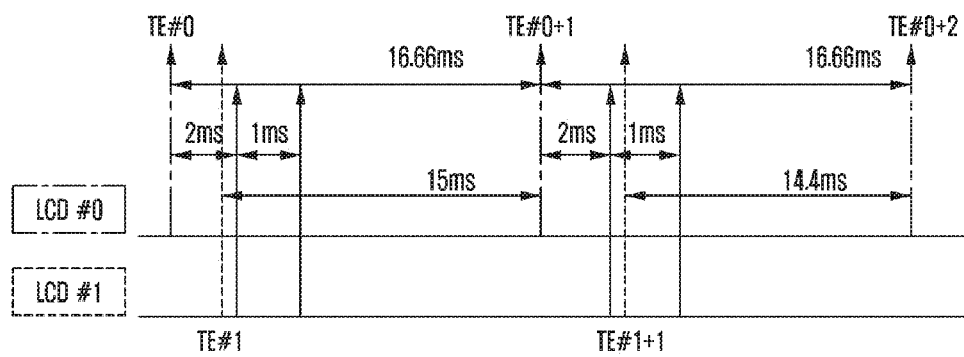
FIGS. 8A and 8B are diagrams illustrating operation of correcting a difference between respective tearing effect (TE) signals in a first display panel and a second display panel according to an embodiment of the present disclosure.
Figure 8B:
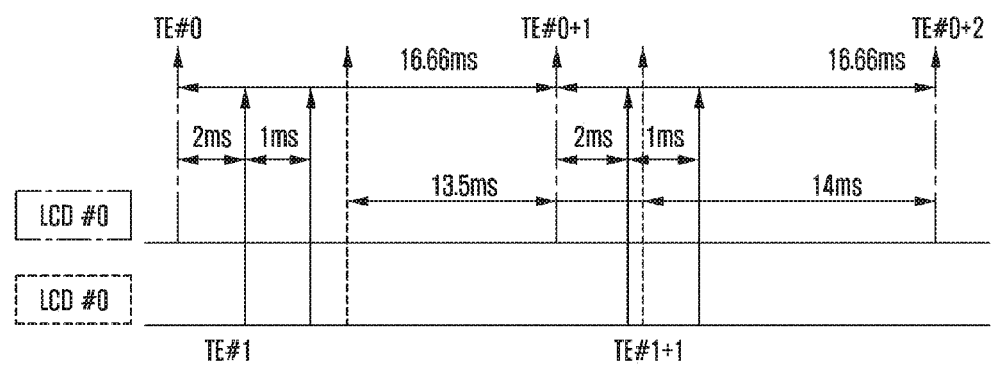

FIGS. 8A and 8B are diagrams illustrating operation of correcting a difference between respective TE signals in a first display panel and a second display panel according to an embodiment of the present disclosure.

Referring to FIGS. 8A and 8B, it is assumed that a signal difference between the first display panel 121 and the second display panel 125 is corrected to a value between 2 ms and 3 ms.

FIG. 8A illustrates operation of transmitting a TE signal, which is a feedback signal from the first display panel LCD #0 and the second display panel LCD #1 to the controller 170. As shown in FIG. 8A, it may be determined that a difference between respective first TE signals TE #0 and TE #1 of the first display panel LCD #0 and the second display panel LCD #1 is a value within 2 ms. From an assumed reference, because a difference between respective TE signals of the first display panel LCD #0 and the second display panel LCD #1 is a value within 2 ms, a frame drop phenomenon or a frame overlap phenomenon may occur. Therefore, according to various embodiments of the present disclosure, the controller 170 may adjust any one of the first display panel LCD #0 and the second display panel LCD #1. Various embodiments of the adjustment operation may be performed, as described above with reference to FIGS. 3 to 6. It may be determined that a difference between respective second TE signals TE #0+1 and TE #1+1 of the first display panel LCD #0 and the second display panel LCD #1 is adjusted to a value between 2 ms and 3 ms by the adjustment operation. Thereby, a frame overlap phenomenon or a frame drop phenomenon can be solved.

Unlike FIG. 8A, in FIG. 8B, it may be determined that a difference between respective first TE signals TE #0 and TE #1 of the first display panel LCD #0 and the second display panel LCD #1 is 3 ms or more. From an assumed reference, because each TE signal difference between the first display panel LCD #0 and the second display panel LCD #1 is 3 ms or more, a frame drop phenomenon or a frame overlap phenomenon may occur. Therefore, according to various embodiments of the present disclosure, the controller 170 may adjust any one of the first display panel LCD #0 and the second display panel LCD #1. Based on the adjustment operation, it may be determined that a difference between respective second TE signals TE #0+1 and TE #1+1 of the first display panel LCD #0 and the second display panel LCD #1 is adjusted to a value between 2 ms and 3 ms. Thereby, a frame overlap phenomenon or a frame drop phenomenon can be solved, as in a case of FIG. 8A.

Figure 9A:
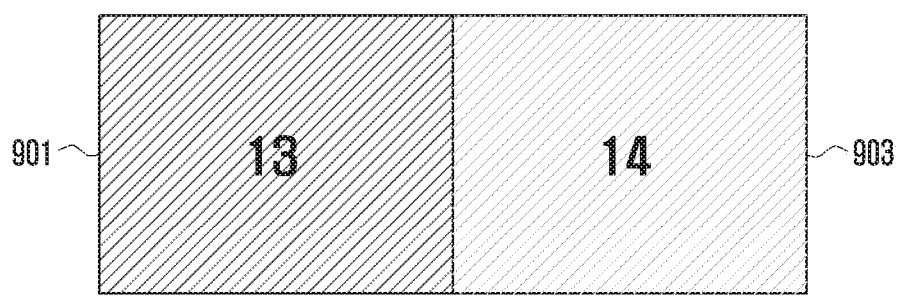
FIGS. 9A and 9B are diagrams illustrating operation in which an electronic device synchronizes screen update by adjusting a clock of a display panel according to an embodiment of the present disclosure.
Figure 9B:
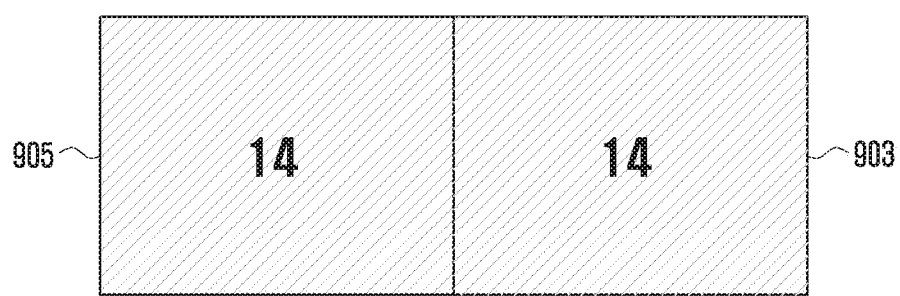

FIGS. 9A and 9B are diagrams illustrating operation in which an electronic device synchronizes screen update by adjusting a clock of a display panel according to an embodiment of the present disclosure.

FIG. 9A illustrates a state in which screen update performed in a first display panel 901 and a second display panel 903 is not synchronized.

Referring to FIG. 9A, a screen including a numeral "13" is displayed on the first display panel 901, but a screen including a numeral "14" is displayed on the second display panel 903.

FIG. 9B illustrates operation of synchronizing screen update of each display panel when a dual screen update function operation is performed according to various embodiments of the present disclosure.

Referring to FIG. 9B, it may be determined that the entire of a first display panel 905 and a second display panel 903 in which a corresponding clock is adjusted outputs a screen including the same numeral "14". Thereby, it may be determined that screen update synchronization of a dual display panel in an MIPI COMMAND mode has been performed.

The term "module" used in the present disclosure may refer to, for example, a unit including at least one combination of hardware, software, and firmware. The "module" may be interchangeably used with a term, such as unit, logic, logical block, component, and/or circuit. The "module" may be a minimum unit of an integrally configured article and/or a part thereof. The "module" may be a minimum unit performing at least one function and/or a part thereof. The "module" may be mechanically and/or electronically implemented. For example, the "module" according to the present disclosure may include at least one of an application-specific integrated circuit (ASIC) chip, a field-programmable gate arrays (FPGA), and a programmable-logic device for performing operations which has been known and/or are to be developed hereinafter.

According to various embodiments of the present disclosure, at least some of the devices (for example, modules or functions thereof) or the method (for example, operations) according to the present disclosure may be implemented by a command stored in a computer-readable storage medium in a programming module form. When the instructions are executed by at least one processor (e.g., the processor 170), the at least one processor may perform functions corresponding to the instructions. The computer-readable storage medium may be, for example, the memory 130.

The computer-readable recording medium may include magnetic media such as a hard disk, a floppy disk, and a magnetic tape, optical media such as a compact disc read only memory (CD-ROM) and a digital versatile disc (DVD), magneto-optical media such as a floptical disk, and hardware devices specially configured to store and perform a program instruction (for example, programming module), such as a read only memory (ROM), a random access memory (RAM), a flash memory and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

As described above, according to various embodiments of the present disclosure, by controlling a clock of each display panel or by controlling each display panel to use the same clock, screen update synchronization performing in a plurality of display panels in an MIPI COMMAND mode can be effectively supported.

Further, a frame overlap phenomenon or a frame drop phenomenon in a plurality of display panels can be reduced, and by operating a display panel using an MIPI COMMAND, consumption power can be reduced.

While the present disclosure has been shown and described with reference to the various embodiments thereof, it will be understood by those skilled in the art various changes in form and details may be made therein without departing from the spirit and scope of the of the present disclosure as defined in the appended claims and their equivalents.

What is claimed is:

1. An electronic device, comprising:
a first display panel comprising a first clock generator and configured to generate a first signal according to the first clock generator in response to a screen update request signal;
a second display panel comprising a second clock generator and configured to generate a second signal according to the second clock generator in response to the screen update request signal; and
a controller configured to:
transmit the screen update request signal to the first display panel and the second display panel, receive the first signal and the second signal,
calculate a deviation value between a first time that the first signal is received and a second time that the second signal is received, and
when the calculated deviation value is out of a predetermined range, transmit a clock control signal to at least one of the first display panel and the second display panel such that the deviation value is within the predetermined range.

2. The electronic device of claim 1,
wherein the electronic device further comprises an external clock generator, and
wherein the controller is further configured to:
deactivate the first clock generator and the second clock generator, and
control the first display panel and the second display panel to generate the first signal and the second signal according to the external clock generator.

3. The electronic device of claim 1, wherein the clock control signal is a signal that controls to reduce or increase a cycle of the clock.

4. The electronic device of claim 1, wherein the controller is further configured to transmit the clock control signal at a blanking or low power internal (BLLP) segment of the first display panel or the second display panel.

5. The electronic device of claim 1, wherein the controller is further configured to transmit the clock control signal at a random segment of the first display panel or the second display panel, when the first display panel and the second display panel comprise a shadow register.

6. The electronic device of claim 1, wherein the controller is further configured to transmit a control signal that turns off the first clock generator or the second clock generator to any one of the first display panel and the second display panel.

7. The electronic device of claim 6, wherein the controller is further configured to adjust a clock of a display panel that is not turned off to a predetermined value, when a clock generator of any one of the first display panel and the second display panel is turned off.

8. The electronic device of claim 7, wherein the controller is further configured to adjust a clock of a clock generator that is turned on based on the adjusted clock, when the clock generator that is turned off is turned-on.

9. The electronic device of claim 1, wherein the controller is further configured to adjust the clock by a proportional-integral-derivative (PID) control method.

10. An electronic device, comprising:
an external clock generator;
a first display panel configured to generate a first signal in response to a screen update request signal;
a second display panel configured to generate a second signal in response to the screen update request signal; and
a controller configured to:
transmit the screen update request signal to the first display panel and the second display panel,
control the first display panel and the second display panel to generate the first signal and the second signal according to the external clock generator,
calculate a deviation value between a first time that the first signal is received and a second time that the second signal is received, and
when the calculated deviation value is out of a predetermined range, transmit a clock control signal to the external clock generator such that the deviation value is within the predetermined range.

11. A method of updating a screen of a display panel in an electronic device comprising a first display panel comprising a first clock generator and a second display panel comprising a second clock generator, the method comprising:
transmitting, by a controller, a screen update request signal to the first display panel and the second display panel;
receiving, by the controller, a first signal generated according to the first clock generator from the first display panel;
receiving, by the controller, a second signal generated according to the second clock generator from the second display panel;
calculating a deviation value between a first time that the first signal is received and a second time that the second signal is receive; and
when the calculated deviation value is out of a predetermined range, adjusting a clock of at least one of the first clock generator and the second clock generator such that the deviation value is within the predetermined range.

12. The method of claim 11, further comprising:
deactivating, by the controller, the first clock generator and the second clock generator; and
controlling, by the controller, the first display panel and the second display panel to generate the first signal and the second signal according to an external clock generator included in the electronic device.

13. The method of claim 11, wherein the clock control signal is a signal that controls to reduce or increase a cycle of the clock.

14. The method of claim 11, wherein the transmitting of the clock control signal to at least one of the first display panel and the second display panel comprises:
transmitting the clock control signal at a blanking or low power internal (BLP) segment of the first display panel or the second display panel; and
transmitting the clock control signal at a random segment of a frame of the first display panel or the second display panel, when the first display panel and the second display panel comprise a shadow register.

15. The method of claim 11, further comprising transmitting, by the controller, a control signal that turns off the first clock generator or the second clock generator to any one of the first display panel and the second display panel.

16. The method of claim 15, further comprising adjusting a clock of a display panel that is not turned off to a predetermined value, when the first clock generator or the second clock generator is turned off.

17. The method of claim 16, wherein the adjusting of the clock of the display panel that is not turned off to a predetermined value comprises adjusting a clock of a clock generator that is turned on based on the adjusted clock, when the clock generator that is turned off is turned on.

18. The method of claim 11, wherein the adjusting of the clock of at least one of the first clock generator and the second clock generator comprises adjusting, by the controller of the electronic device, the clock by a proportional-integral-derivative (PID) control method.

* * * * *